Aug. 27, 1935.  W. BORRMANN ET AL  2,012,373

PISTON FOR INTERNAL COMBUSTION ENGINES

Filed Aug. 14, 1933

Inventors:
Waltimar Borrmann
and Friedrich Ahrens

Patented Aug. 27, 1935

2,012,373

UNITED STATES PATENT OFFICE 2,012,373

PISTON FOR INTERNAL COMBUSTION ENGINES

Waldemar Borrmann, Badersleben, and Friedrich Ahrens, Vogelsdorf Kreis Oschersleben, Germany Application August 14, 1933, Serial No. 685,058
In Germany March 6, 1933

1 Claim. (Cl. 309—15)

Pistons for internal combustion engines are known, in which the piston rings are arranged in an exchangeable piston head. It is also known to allow the piston head to engage in steps in the piston body. As the piston parts off-set in steps are, however, of cylindrical shape, a concentric bearing of the piston parts can only be attained if the off-set parts are accurately adapted to one another. Moreover, in the known piston stresses occur between the two piston parts, owing to the employment of cylindrical surrounding elements for connecting the piston head and the piston body, when the piston parts are made of different metals.

These objections are overcome by the piston according to the invention in which the gudgeon pin bearings are extended beyond the upper edge of the piston body and provided on their outer side with sector-shaped conically stepped extensions against which similarly shaped hollow conical steps of the piston head bear. Owing to the conical interengagement of the two piston parts, not only an accurate concentric bearing of the piston head on the piston body is obtained, but also the occurrence of stresses between the piston parts is avoided because the sector-shaped extensions only extend over about half the circumference of the piston.

An embodiment of the invention is illustrated by way of example in the accompanying drawing in which:—

Figure 2:
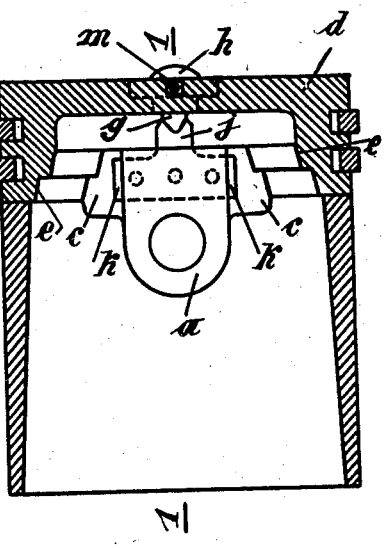
Fig. 2 is a longitudinal section on line 2—2 of Fig. 1.
Figure 3:
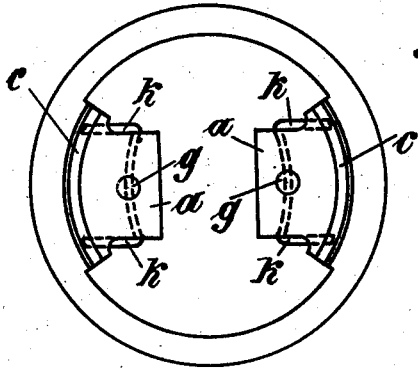
Fig. 3 is a top plan view of the lower portion of the piston.

The gudgeon pin bearings $a$ of the lower part $b$ of the piston are extended beyond the upper edge thereof and constructed on the outer side as sector shaped projections $c$ (Fig. 3) which are provided with truncated conical steps on which the piston top $d$ rests which is provided in its lower end with conical ring shaped circumferential steps $e$ (Fig. 2).

Figure 1:
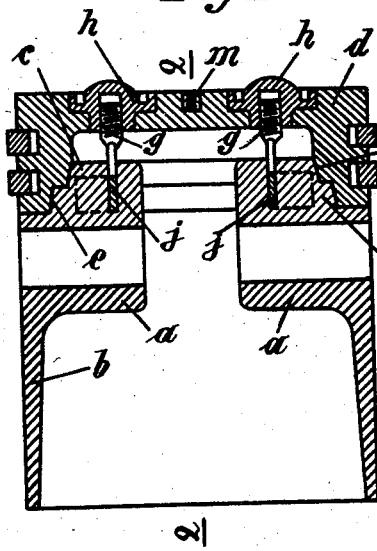
Fig. 1 is a longitudinal section through the piston on line 1—1 of Fig. 2.
Figure 4:
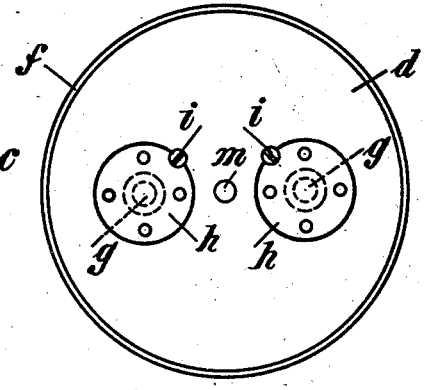
Fig. 4 shows the piston top in top plan view.

The piston top $d$ carrying the piston rings $f$ is fixed on the lower part $b$ of the piston by plate screws $g$ cast in the extensions of the gudgeon pin bearings $a$ with the aid of circular nuts $h$ which fit snugly in corresponding bores in the piston top $d$ (Fig. 1) and are screwed on or unscrewed from the screws $g$ with the aid of a pin wrench. The nuts $h$ may be locked by screw pins $i$ (Fig. 4). The plates $j$ of the screws $g$ may be provided with portions $k$ bent at right angles which are cast in the extensions of the gudgeon pin eyes $a$ or bear against the side surfaces of the eyes $a$ in the manner shown in Fig. 3 and cast with their ends in the sectors $c$.

A screw threaded bore $m$ is provided in the middle of the piston top $d$ to enable the piston top to be removed from the lower part $b$ of the piston by screwing a handle into the bore $m$ after the nuts $h$ have been unscrewed.

The lower part $b$ of the piston may be made of cast iron and the piston top $d$ of aluminium or the body $b$ may be made of aluminum and the piston top $d$ of cast iron, as stresses cannot occur owing to the novel connection of the piston parts, because the sector shaped projections of the lower part of the piston only covers about half the circumference of the piston.

As in the piston according to the invention parts already existing on the piston are employed for connecting the piston top to the piston bottom and which need only be suitably re-shaped, the piston according to the invention is not heavier and not more expensive than the ordinary pistons.

We claim:—

A piston for internal combustion engines, comprising in combination a body and a head removable from the body, gudgeon pin bearings on said body extending beyond the upper edge of said body and formed on the outer side sector-shaped projections with cone section-shaped steps, said piston head having on its inner side at its lower end conical ring-shaped circumferential steps engaging said step projections of said piston body, and fixing means comprising plate screws cast in the piston body and adapted to connect said piston body with said piston head.

WALDEMAR BORRMANN.
FRIEDRICH AHRENS.